United States Patent [19]

Johnson et al.

[11] Patent Number: 6,106,968
[45] Date of Patent: Aug. 22, 2000

[54] SMART VALVE REGULATED LEAD ACID BATTERY WITH EMBEDDED ELECTRONIC MONITORING AND FLUID FILL SYSTEM

[75] Inventors: Mark A. Johnson; Patrick K. Ng, both of Plano, Tex.

[73] Assignee: Lucent Technologies Inc., Murray Hill, N.J.

[21] Appl. No.: 09/036,399

[22] Filed: Mar. 6, 1998

[51] Int. Cl.[7] .......................... H01M 2/36; H01M 10/48; G01N 27/42

[52] U.S. Cl. .................. 429/50; 429/63; 429/64; 429/72; 429/92; 429/93; 137/260; 324/427; 324/431

[58] Field of Search ........................... 429/50, 51, 61–64, 429/72, 80, 81, 90–93; 137/260; 320/132, 134, 136; 324/425–428, 431, 432

[56] References Cited

U.S. PATENT DOCUMENTS

| | | | |
|---|---|---|---|
| 4,289,836 | 9/1981 | Lemelson | 429/61 |
| 4,304,823 | 12/1981 | Lemelson | 429/19 |
| 5,453,334 | 9/1995 | Melichar | 429/64 |
| 5,631,540 | 5/1997 | Nguyen | 320/30 |
| 5,659,240 | 8/1997 | King. | |

*Primary Examiner*—Maria Nuzzolillo
*Assistant Examiner*—Jonathan Crepeau

[57] ABSTRACT

For use with a valve regulated lead acid (VRLA) battery, a fluid fill system and a method of maintaining fill fluid in a VRLA battery. In one embodiment, the system includes: (1) a fluid determination circuit, associated with the battery, that determines a quantity of fill fluid in the VRLA battery and (2) a controller, coupled to the fluid determination circuit, that introduces replacement fill fluid into the VRLA battery based on the quantity to replace fill fluid lost from the VRLA battery. The fluid determination circuit comprises sensors that measure a temperature and pressure associated with the VRLA battery, and a state of a fluid release valve on the battery.

20 Claims, 3 Drawing Sheets

# SMART VALVE REGULATED LEAD ACID BATTERY WITH EMBEDDED ELECTRONIC MONITORING AND FLUID FILL SYSTEM

TECHNICAL FIELD OF THE INVENTION

The present invention is directed, in general, to batteries and battery monitoring systems and, more specifically, to a smart valve regulated lead acid (VRLA) battery having an embedded electronic monitoring and fluid fill system and a method of maintaining fill fluid in the same.

BACKGROUND OF THE INVENTION

Valve Regulated Lead Acid (VRLA) batteries have been increasingly deployed in outdoor telecommunications applications as a source of energy when a primary source of power is interrupted. Commonly, the lead acid batteries are referred to as "starved electrolyte" batteries, since the batteries have less acid electrolytes in comparison to batteries of the past. Batteries of this nature contain a specified amount of water as a main component. Underfilling or overfilling the batteries with water may cause a decrease in performance, capacity and lifetime.

Employed in reserve power supplies, a plurality of batteries are often coupled together into battery strings. In practice, the battery strings are constantly in a state of slight charging. Through a variety of techniques, a voltage is supplied to maintain the batteries in a fully charged state. These techniques include, among others, float, boost, equalize and intermittent charging.

At present, the capacity and reserve time of the entire string is monitored because it is very expensive to monitor the charges on the individual batteries. As a result, when a battery string loses reserve capacity, the common practice is to replace the entire string rather than a number of single batteries which may be the cause of the power loss. Due to this replacement practice, perfectly good batteries may be pulled from service. If the condition of the individual batteries could be measured or predicted, a great deal of time and money could be saved since only the failed batteries would be replaced.

In warm climates, high, uncontrolled temperatures have been found to significantly shorten the life of the battery. It is not uncommon, in these environments, for the battery life to be nearly half of its normal value. The deterioration has several root causes, namely, grid corrosion, valve design and plastic jar material selection. Ultimately, the root causes lead to water loss which causes severe damage in the VRLA batteries. Replenishing the water on a regular basis is the best method for avoiding this type of damage. At present, refilling the VRLA batteries is extremely difficult and expensive and can only be accomplished manually. There is a great need to replenish the lost water in an automated and controlled manner to extend the life of the battery.

Not only has the outdoor uncontrolled temperature profile caused a reduction in the battery life, it has resulted in great uncertainty in estimating the battery life and the available capacity in the battery. Although algorithms are available to predict the battery capacity, a monitoring system is needed to collect the necessary information for the calculation. To reduce installation time, it is desirable to have an electronic monitoring system built into the battery to perform the capacity calculation locally. The result is a monitoring system that can identify the condition of each individual battery.

Accordingly, what is needed in the art is a system for maintaining the fill fluid level of a battery that overcomes the deficiencies in the prior art.

SUMMARY OF THE INVENTION

U.S. Pat. No. 5,631,540 by Nguyen, commonly assigned with the present invention, and entitled "Method and Apparatus for Predicting the Remaining Capacity and Reserve Time of a Battery on Discharge" discloses a method of predicting capacity and reserve time of a battery on discharge. This patent discloses relationships between numerous variables for determining the battery capacitance and associated reserve time. These variables include discharge current, battery voltage, battery temperature and the battery's internal resistance. Nguyen is incorporated herein by reference as if it is reproduced herein in its entirety.

To address the above-discussed deficiencies of the prior art, the present invention provides, for use with a VRLA battery, a fluid fill system and a method of maintaining fill fluid (typically water) in a VRLA battery. In one embodiment, the system includes: (1) a fluid determination circuit, associated with the battery, that determines a quantity of fill fluid in (or lost from) the VRLA battery and (2) a controller, coupled to the fluid determination circuit, that introduces (usually liquid) replacement fill fluid into the VRLA battery based on the (remaining or lost) quantity to replace fill fluid lost from the VRLA battery.

The present invention therefore introduces the broad concept of determining (either by directly or indirectly sensing or calculating) the fill fluid either remaining or lost from a VRLA battery and automatically replacing the fill fluid to maintain the VRLA battery's fill fluid level.

In one embodiment of the present invention, the fluid determination circuit comprises sensors, associated with the VRLA battery, that measure a temperature, a pressure within the VRLA battery (perhaps within a gas compartment thereof) and a state of a fluid release valve on the VRLA battery and wherein the controller introduces the replacement fill fluid into the VRLA battery based on the temperature, pressure and state to replace the fill fluid lost through the fluid release valve to the outside ambient. Alternatively, the fluid level or weight of the VRLA battery may be measured. Alternatively, lost or remaining fill fluid may be calculated with reference to predetermined equations (thereby eliminating a need for sensors).

In one embodiment of the present invention, the temperature is an internal temperature of the VRLA battery. Alternatively, the temperature may be a temperature outside the battery.

In one embodiment of the present invention, the fluid release valve is a one-way valve having a predetermined opening pressure. In this embodiment, the controller can determine a quantity of fill fluid lost by knowing the pressure-dependent flow rate of the valve and measuring the time during which the valve is open.

In one embodiment of the present invention, the controller determines a quantity of the fill fluid lost over time and controls a fluid fill valve to cause the replacement fill fluid to flow from a reservoir into the VRLA battery. The controller can thus introduce a standard quantity of fill fluid at times that vary according to fill fluid loss. Alternatively, the controller can compensate for individual fill fluid losses.

In one embodiment of the present invention, the VRLA battery has an electronics compartment coupled to a jar thereof, the controller contained substantially within the electronics compartment. The electronics compartment may be molded integrally with the jar or may be affixed to the jar. The present invention therefore contemplates embodiments wherein the battery and circuit form a single unit.

In one embodiment of the present invention, the VRLA battery has a reservoir coupled to a jar thereof, the reservoir containing the replacement fill fluid. As with the electronics compartment, the reservoir may be molded integrally with the jar or may be affixed to the jar.

In one embodiment of the present invention, the sensors further measure a current drain rate and voltage of the VRLA battery, the controller further employing the temperature, current drain rate and voltage to predict a capacity of the VRLA battery. Additionally, if the predicted capacity is lower than a preselected capacity, fill fluid may introduced to replace predicted lost fill fluid. The controller can therefore form a portion of a more inclusive voltage regulated lead acid (VRLA) battery management system.

In one embodiment of the present invention, the controller comprises an interface that provides battery data to central monitoring circuitry. In a related embodiment, the controller derives operating power from the VRLA battery and provides battery data via power terminals of the VRLA battery. Of course, the controller may derive power from source external to the VRLA battery and can provide data via a separate data bus. The controller may also accept commands from the central monitoring circuitry, allowing the fluid fill system to form part of a battery plant control system.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
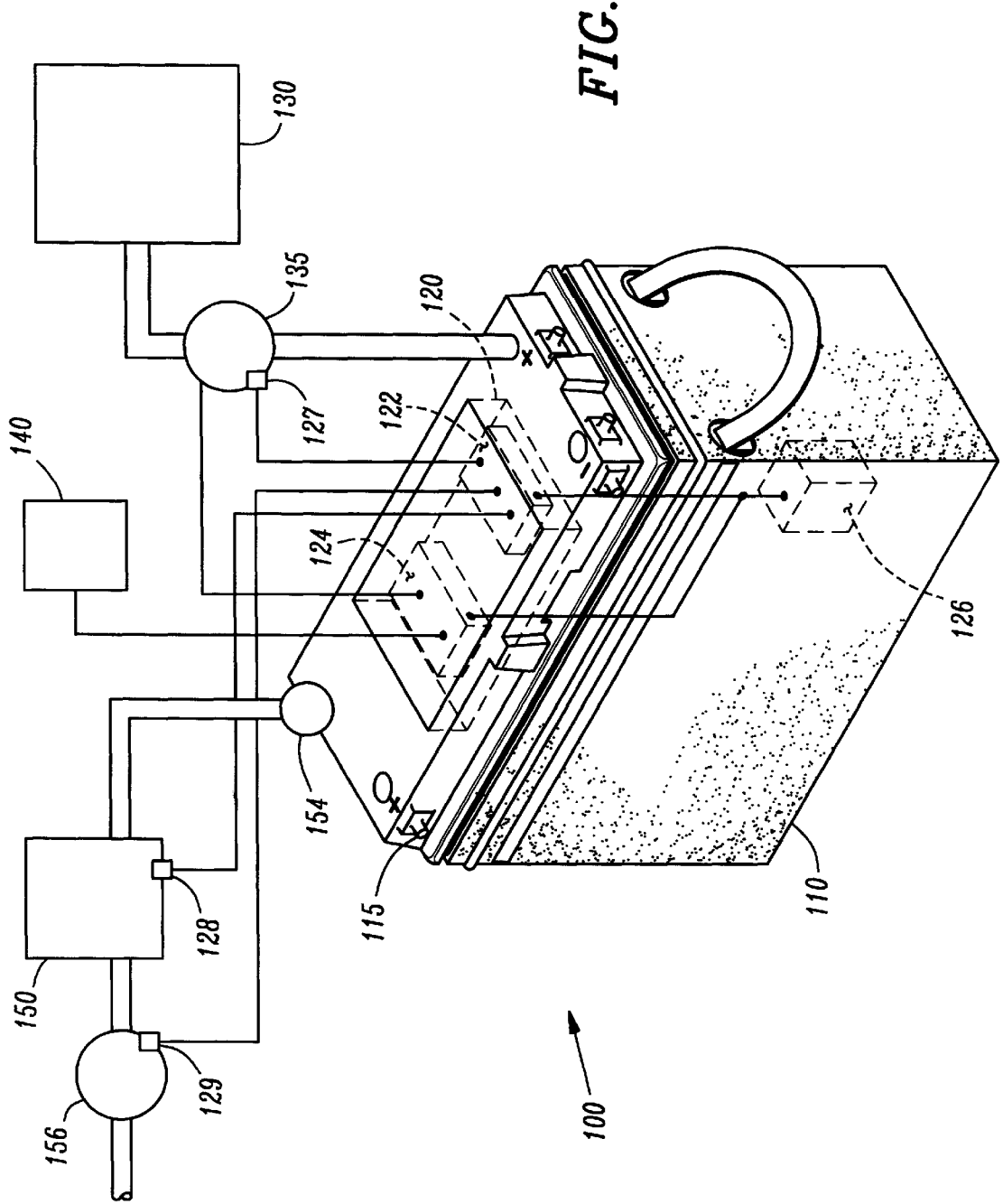
FIG. 1 illustrates an isometric view of an embodiment of a valve regulated lead acid (VRLA) battery constructed according to the principles of the present invention.

Referring initially to FIG. 1, illustrated is an isometric view of an embodiment of a valve regulated lead acid (VRLA) battery 100 constructed according to the principles of the present invention. The battery 100 includes a conventional VRLA battery jar 110 in which is embedded an electronics compartment 120 containing a fluid maintenance system comprising a fluid determination circuit 122 coupled to a controller circuit or controller 124. A first gas release valve (or first fluid release valve) 154 is connected to the battery 100 and allows gas built-up inside the battery 100 by the loss of fluid to be released into a gas release compartment 150 that has a known volume. A second gas release valve (or second fluid release valve) 156 is also coupled to the gas release compartment 150 allowing built-up gas to be released into the environment. Both gas release valves 154, 156 are one-way valves and the second gas release valve 156 opens at a predetermined pressure. Additionally, a fluid replenishment reservoir 130 is coupled to the battery 100 and contains fluid, commonly de-ionized or distilled water, to refill the battery 100 as it loses fluid during adverse conditions. Located between the reservoir 130 and the battery 100 is a one-way valve (or fill fluid release valve) 135 which opens at a predetermined pressure when it receives command signals from the controller circuit 124.

The controller 124 issues command signals to the valve 135 when the fluid determination circuit 122 signals that the battery 100 has lost fluid. The controller circuit 124 is further coupled to a controller-battery interface circuit 140 that senses various battery conditions. The fluid determination circuit 122 and the controller circuit 124 derive operating power from the battery 100 and provide battery data via power terminals (one of which is designated 115) of the battery 100.

The fluid determination circuit 122 is coupled to a plurality of sensors. A first sensor 126 measures the battery 100 temperature and a second sensor 127 senses the states of the one-way valve 135. A third sensor 128 senses temperature and pressure in the gas release compartment 150 and a fourth sensor 129 senses the state of the second gas release valve 156. While sensing the state of the second gas release valve 156, the fluid determination circuit 122 calculates the time between gas releases, which is used in determining the need for fluid replenishment. Furthermore, the first sensor 126 measures the rate of current drain and the battery voltage. The first sensor 126 senses various electrical characteristics (such as voltage or current) via the power terminals 115. The controller 124 receives the sensed data and calculates the battery capacity using, for instance, the values of the rate of current drain, battery voltage and battery temperature acquired from the fluid determination circuit 122.

Figure 2:
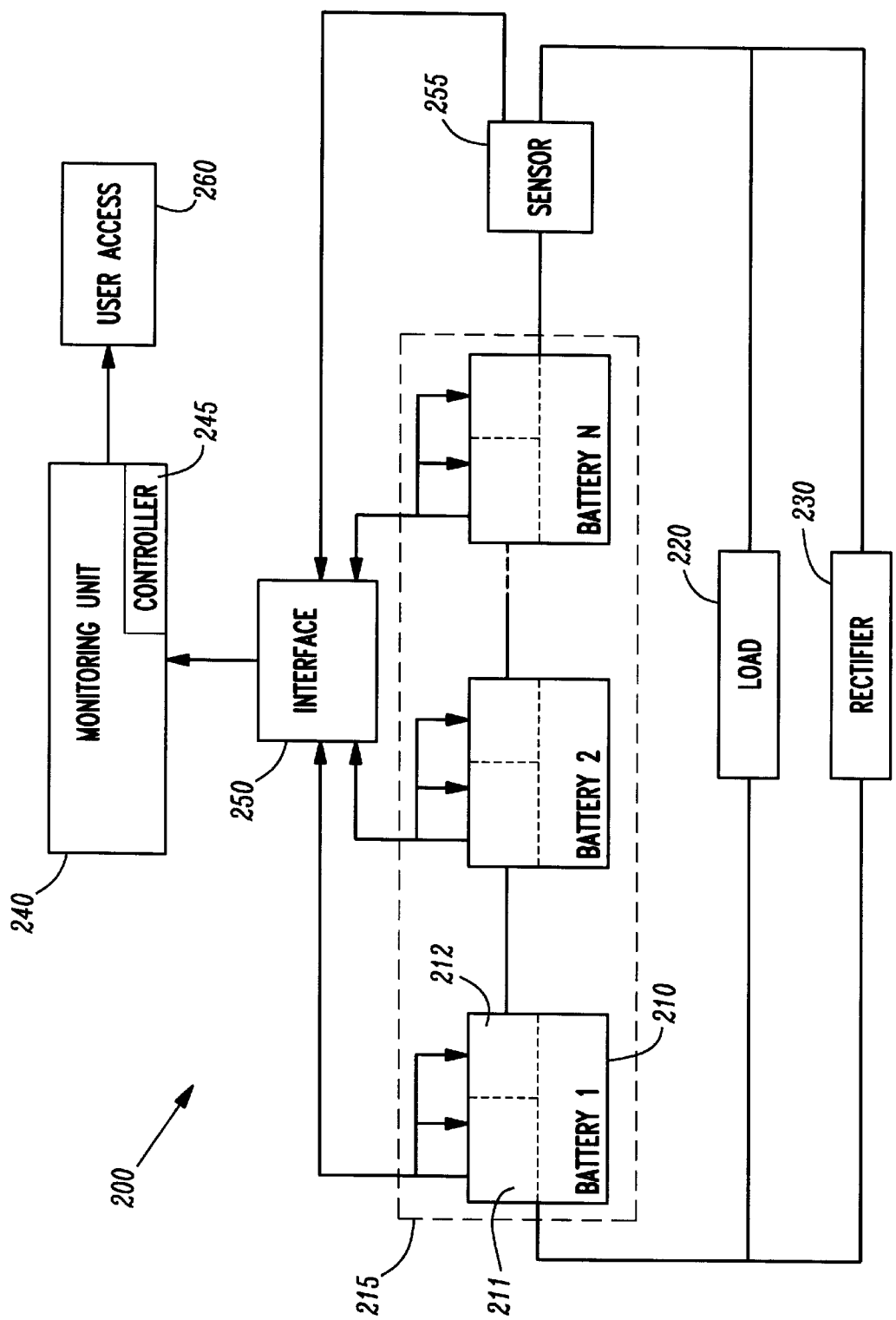
FIG. 2 illustrates a block diagram of a battery plant monitoring system employing VRLA batteries constructed according to the principles of the present invention.

Turning now to FIG. 2, illustrated is a block diagram of a battery plant monitoring system 200 employing VRLA batteries constructed according to the principles of the present invention. The system 200 includes a plurality of series-coupled batteries (one of which designated as 210) that form a battery string 215. Each battery 210 has circuitry for battery monitoring and control 211 and fluid determination and refilling circuitry 212, both of which receive constant feedback regarding the various states of the battery 210. Coupled across the battery string 215 is plant load 220. A rectifier 230 is further coupled across the load 220 and the battery string 215 to supply a rectified voltage to the load 220 and to charge the batteries 210 in the battery string 215.

A battery monitoring unit 240 is coupled to a controller-battery interface 250 and to a user access device 260. The interface 250 is coupled to each battery in the battery string 215 to sense, for instance, the voltage, temperature and internal resistance of each battery 210. The interface 250 is further coupled to a current sensor 255 that is coupled between the battery string 215 and the load 220. The current sensor 255 senses the battery string 215 current and relays the information to the interface 250. Additionally, where the system 200 contains multiple strings, each string would contain a current sensor 255 to relay individual string currents to the interface 250.

The battery monitoring unit 240 includes a stored program controller 245 which accepts data from the battery interface 250 and background data from the user access device 260. The stored program controller 245 also includes instructions for utilizing the data input for predicting a remaining charge capacity and reserve time until discharge to a specific end voltage of the battery string 215. This information is communicated through the user access device 260.

Figure 3:
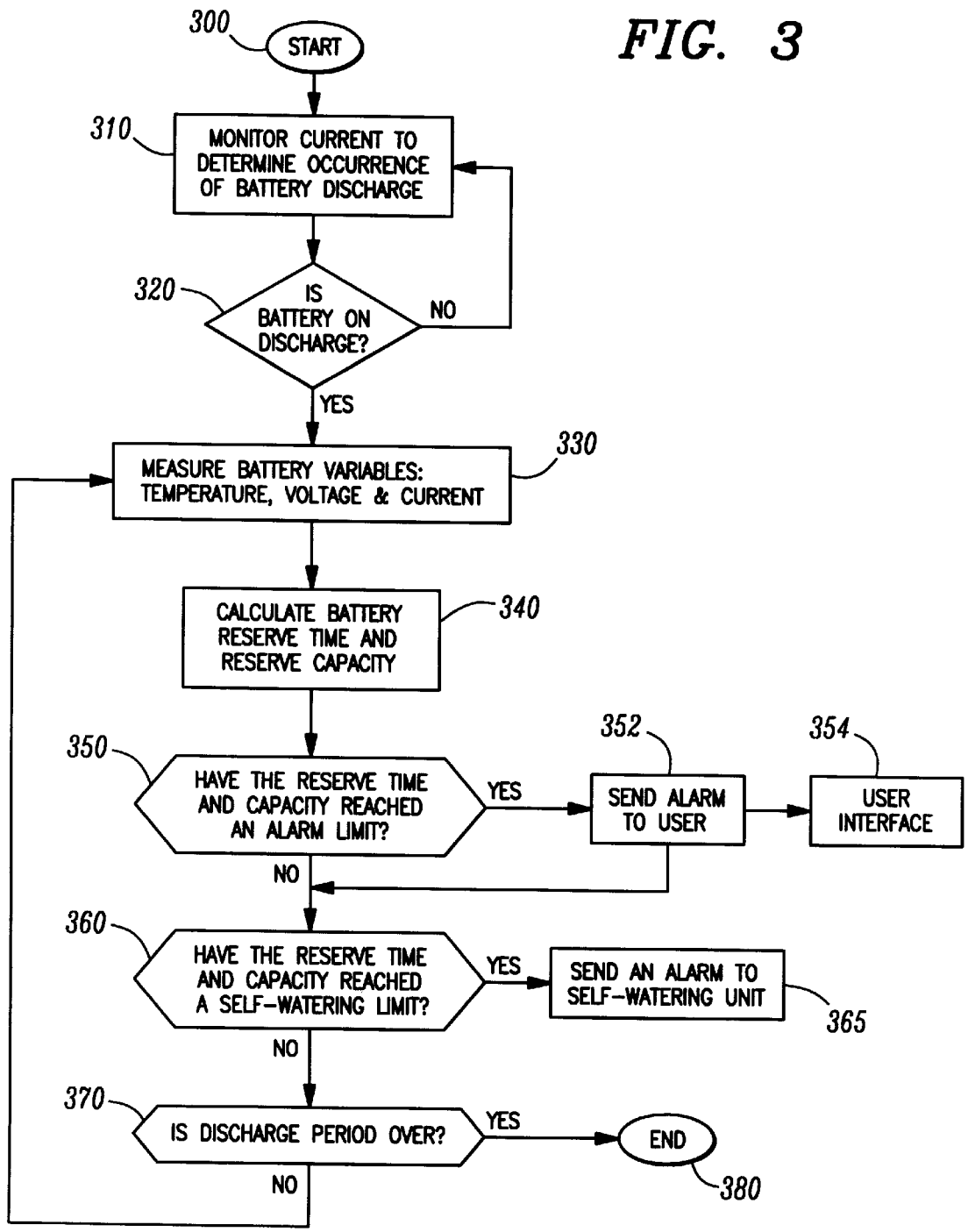
FIG. 3 illustrates a flow diagram illustrating the method of determining the remaining capacity, reserve time and required necessary water refill.

Turning now to FIG. 3, illustrated is a flow diagram of an exemplary method of determining the remaining capacity, reserve time and required necessary water refill of the battery 100 of FIG. 1. The method begins at a start step 300 and proceeds to a first measurement step 310. At the first measurement step 310, the battery 100 current is measured. At a first decisional step 320, the measured current is examined to determine if the battery 100 is in discharge mode. If the battery 100 is determined not to be in discharge, the method returns to the first measurement step 310 to re-measure the current.

Should the battery 100 be in a discharge mode, at a second measurement step 330, the battery 100 temperature, voltage and rate of current drain are measured. Then, at a first calculation step 340, the remaining battery 100 reserve time and capacity are calculated. At a second decisional step 350, it is determined whether the battery reserve time and remaining capacity as calculated in the first calculation step 340 have dropped to such a level as to reach an alarm limit. If the battery reserve time and remaining capacity are determined to be below an alarm limit, an alarm is issued (at an alarm step 352) and sent to a user interface (at a send to user interface step 354). After the alarm is issued, the battery reserve time and remaining capacity are considered again at a third decisional state 360. During the entire method, the various measured readings are transmitted to a battery monitoring unit 240 as illustrated in FIG. 2.

If the battery reserve time and remaining capacity are determined not to be in a alarm state, the battery reserve time and remaining capacity are considered in the third decisional step 360. In this step, if the battery reserve time and remaining capacity have dropped to a predetermined self-watering limit, an alarm is sent to, e.g., the controller circuit 124 in the electronics compartment 120 during an self-watering alarm step 365. Thereafter, the circuitry will calculate the amount of water to be delivered to the battery 100 from the fluid replenishment reservoir 130. Thereafter, the internal circuitry will signal the one-way valve 135 to open and allow a determined quantity of fluid to flow to the battery 100.

The amount of water to be delivered to the battery 100 is determined on either a system level or on an individual battery level. On a system level, the monitoring unit 240 and the controller unit 250 can predict the remaining reserve time and capacity. If the system determines the battery's 100 reserve time and capacity are below the specified level, the battery 100 will be refilled with water from the reservoir 130.

Additionally, by monitoring the internal temperature of the gas release compartment 150 and pressure and the time between gas releases, the amount of fill fluid lost from the battery can be estimated. The gas released from the battery is commonly a mixture of hydrogen and oxygen, with hydrogen being the more dominant gas. This amount of fill fluid can be estimated by solving for n in the following:

$$\Delta PV = \Delta nRT \text{ or } PV = nRT$$

where: $\Delta P$=difference between the gas release compartment's pre-gas release pressure and the post-gas release pressure.

V=fluid volume within the gas release compartment
R=a specified gas constant.
T=temperature within the gas release compartment
$\Delta n$=number of moles of gas released from the gas release compartment.

At a first approximation, the number of moles of fill fluid (commonly water) which is added to the battery is proportionate to the calculated number of moles of gas (hydrogen) released from the battery. Once the amount of fluid lost is estimated, the battery's internal circuitry can open the one-way valve 135 and allow fluid from the reservoir 130 to replenish the battery 100.

Should it be determined that the battery reserve time and remaining capacity have not fallen to an alarm limit, the current is once more considered to determine if the battery 100 is still in a discharge mode (at a fourth decisional step 370). If the battery 100 is in discharge, the method returns to the second measurement step 330 to continue the method. If the battery is not in discharge, the method concludes at an end step 380.

For a better understanding of the fundamentals of batteries, such as VRLA batteries, see *Maintenance Free Batteries*, by D. Berndt, John Wiley & Sons, Inc. (1993) and *Lead-Acid Batteries*, by H. Bode, John Wiley & Sons, Inc. (1977), both of which are incorporated herein by reference.

Although the present invention has been described in detail, those skilled in the art should understand that they can make various changes, substitutions and alterations herein without departing from the spirit and scope of the invention in its broadest form.

What is claimed is:

1. A fluid maintenance system for use with a valve regulated lead acid (VRLA) battery, comprising:

a fluid determination circuit, associated with said battery, that measures a pressure associated with said VRLA battery and determines therefrom a quantity of fill fluid in said VRLA battery; and a controller, coupled to said fluid determination circuit, that introduces replacement fill fluid into said VRLA battery based on said quantity to replace fill fluid lost from said VRLA battery.

2. The system as recited in claim 1 wherein said fluid determination circuit comprises sensors, associated with said VRLA battery, that measure a temperature associated with said VRLA battery, said pressure and a state of a fluid release valve on said VRLA battery and wherein said controller introduces said replacement fill fluid into said VRLA battery based on said temperature, pressure and state to replace said fill fluid lost through said fluid release valve.

3. The system as recited in claim 2 wherein said fluid release valve is a one-way valve having an opening pressure.

4. The system as recited in claim 2 wherein said sensors further measure a current drain rate and voltage of said VRLA battery, said controller further employing said temperature, current drain rate and voltage to predict a capacity of said VRLA battery.

5. The system as recited in claim 1 wherein said controller determines a quantity of said fill fluid lost over time and controls a fluid fill valve to cause said replacement fill fluid to flow from a reservoir into said VRLA battery.

6. The system as recited in claim 1 wherein said VRLA battery has an electronics compartment coupled to a jar thereof, said controller contained substantially within said electronics compartment.

7. The system as recited in claim 1 wherein said VRLA battery has a reservoir coupled to a jar thereof, said reservoir containing said replacement fill fluid.

8. The system as recited in claim 1 wherein said controller comprises an interface that provides battery data to central monitoring circuitry.

9. The system as recited in claim 1 wherein said controller derives operating power from said VRLA battery and provides battery data via power terminals of said VRLA battery.

10. A VRLA battery containing the system as recited in claim 1.

11. A method of maintaining fill fluid in a valve regulated lead acid (VRLA) battery, comprising:

measuring a pressure associated with said VRLA battery;

determining a quantity of fill fluid in said VRLA battery from said pressure; and automatically introducing replacement fill fluid into said VRLA battery based on said quantity to replace fill fluid lost from said VRLA battery.

12. The method as recited in claim 11 wherein said determining comprises measuring a temperature associated with said VRLA battery, said pressure and a state of a fluid release valve on said VRLA battery during an operation thereof and said automatically introducing comprises automatically introducing said replacement fill fluid into said VRLA battery based on said temperature, pressure and state to replace said fill fluid lost through said fluid release valve.

13. The method as recited in claim 12 wherein said fluid release valve is a one-way valve having an opening pressure.

14. The method as recited in claim 12 further comprising:

measuring a current drain rate and voltage of said VRLA battery; and employing said temperature, current drain rate and voltage to predict a capacity of said VRLA battery.

15. The method as recited in claim 11 wherein said introducing comprises:

determining a quantity of said fill fluid lost over time; and controlling a fluid fill valve to cause said replacement fill fluid to flow from a reservoir into said VRLA battery.

16. The method as recited in claim 11 wherein said VRLA battery has an electronics compartment coupled to a jar thereof, a controller contained substantially within said electronics compartment.

17. The method as recited in claim 11 wherein said VRLA battery has a reservoir coupled to a jar thereof, said reservoir containing said replacement fill fluid.

18. The method as recited in claim 11 further comprising providing battery data to central monitoring circuitry.

19. The method as recited in claim 11 further comprising:

deriving operating power from said VRLA battery; and providing battery data via power terminals of said VRLA battery.

20. The method as recited in claim 11 wherein said introducing comprises solving for n in:

$$PV = nRT$$

wherein

P is said pressure,

V is a fluid volume within a gas release compartment associated with said VRLA battery, R is a gas constant, and T is a temperature associated with said VRLA battery.

* * * * *